Figure 1:
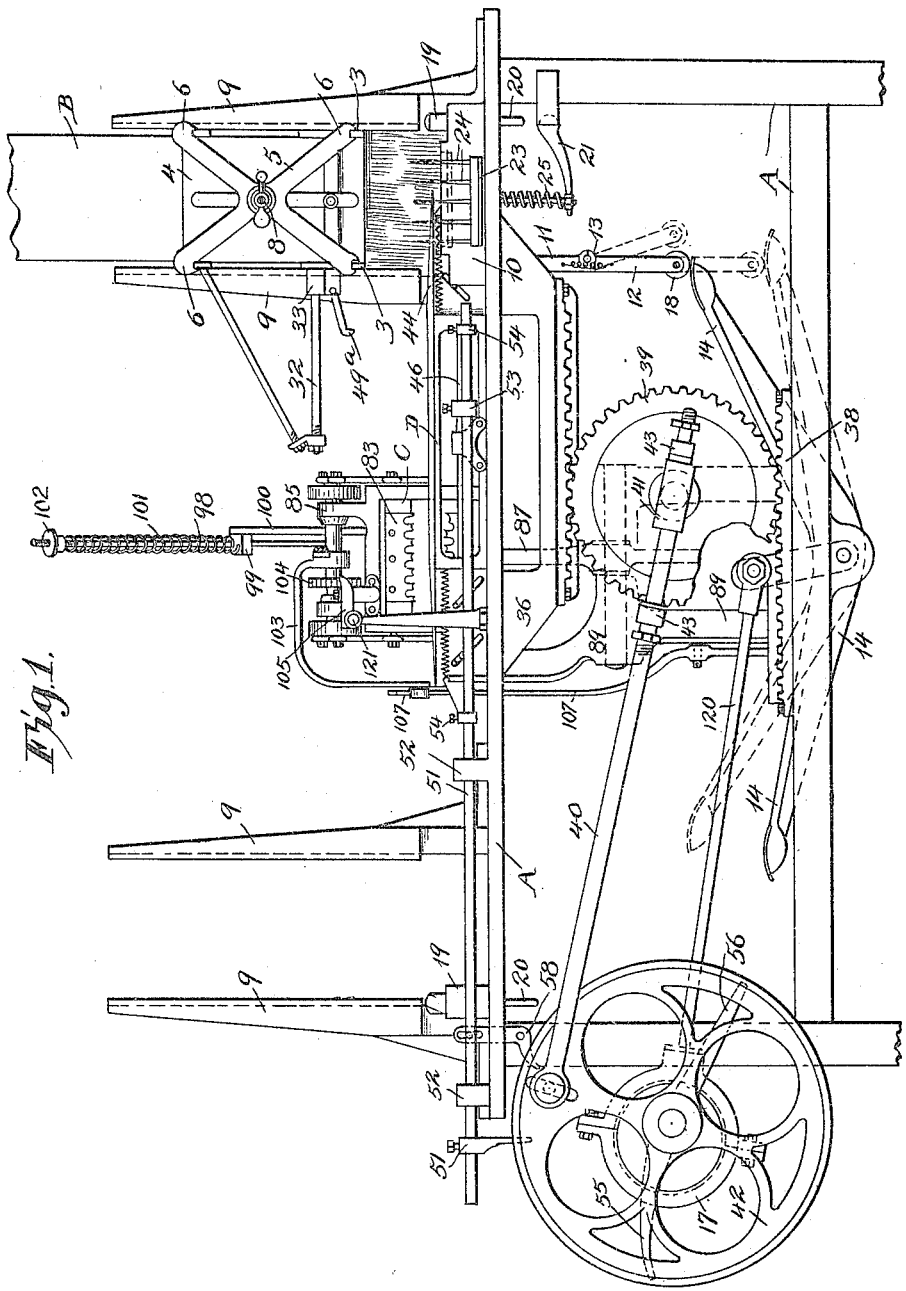

S. G. ROSEMAN.
BRUSH MAKING MACHINERY.
APPLICATION FILED NOV. 4, 1913.

1,123,596.

Patented Jan. 5, 1915.
5 SHEETS—SHEET 1.

Witnesses:
E. A. Singer
M. O. Hipling

Inventor:
Samuel George Roseman
by B. Singer
Atty.

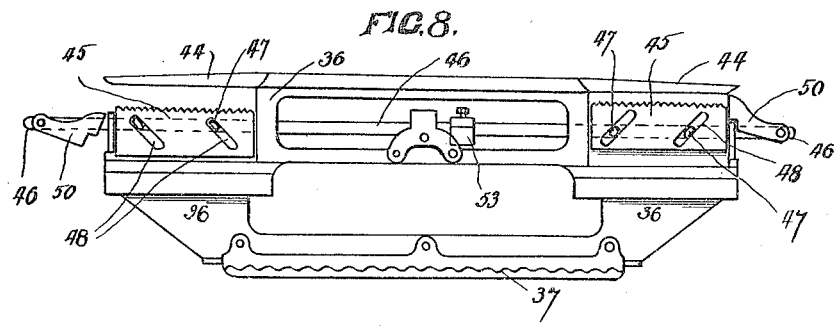
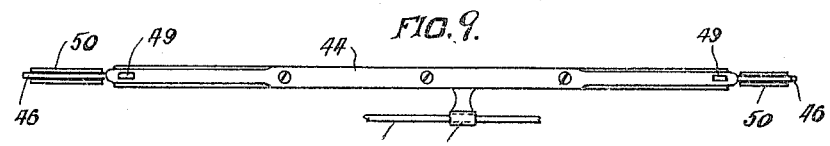
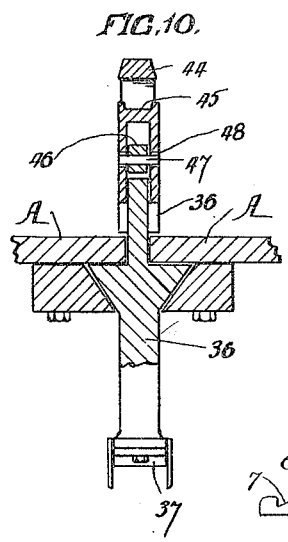
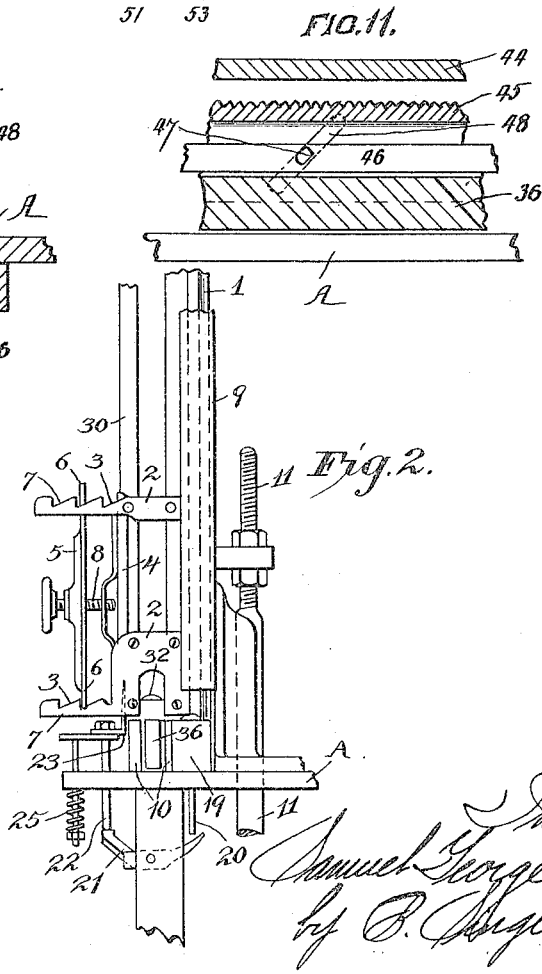

S. G. ROSEMAN.
BRUSH MAKING MACHINERY.
APPLICATION FILED NOV. 4, 1913.
1,123,596.
Patented Jan. 5, 1915.
5 SHEETS—SHEET 3.
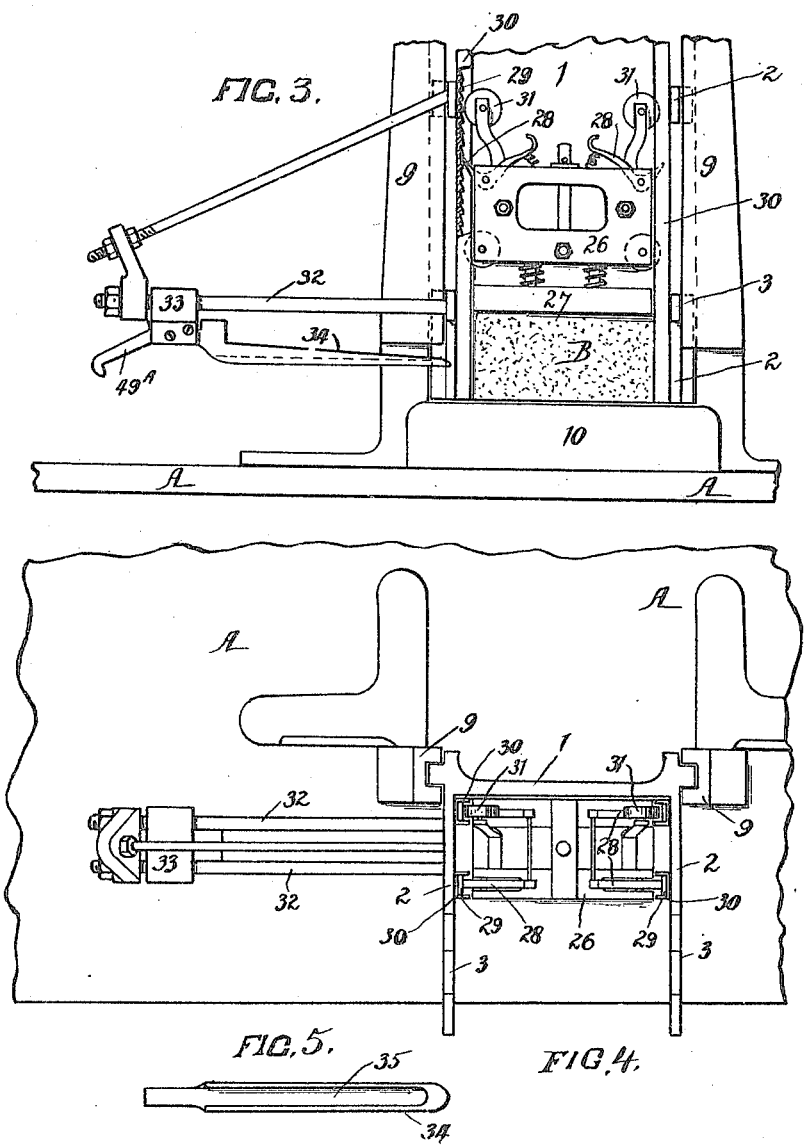

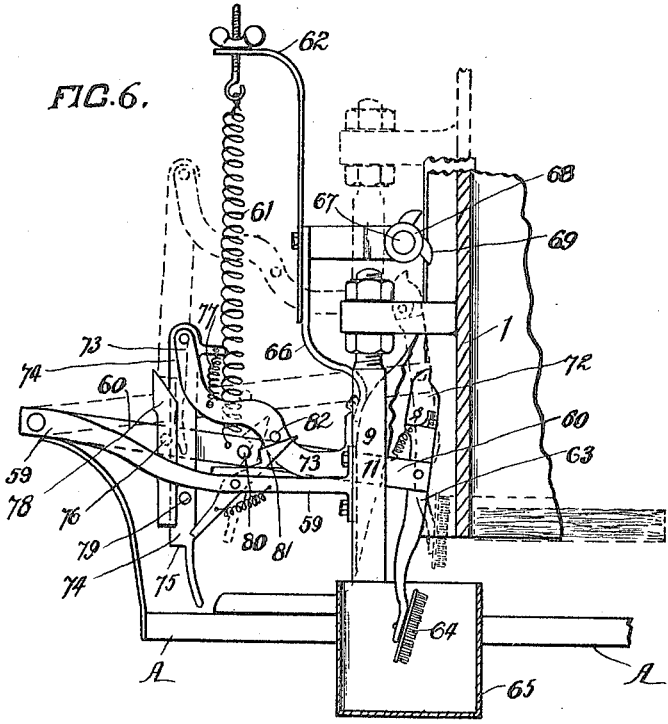
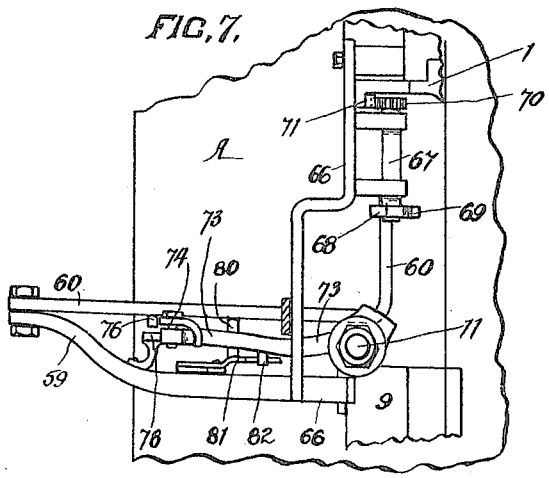

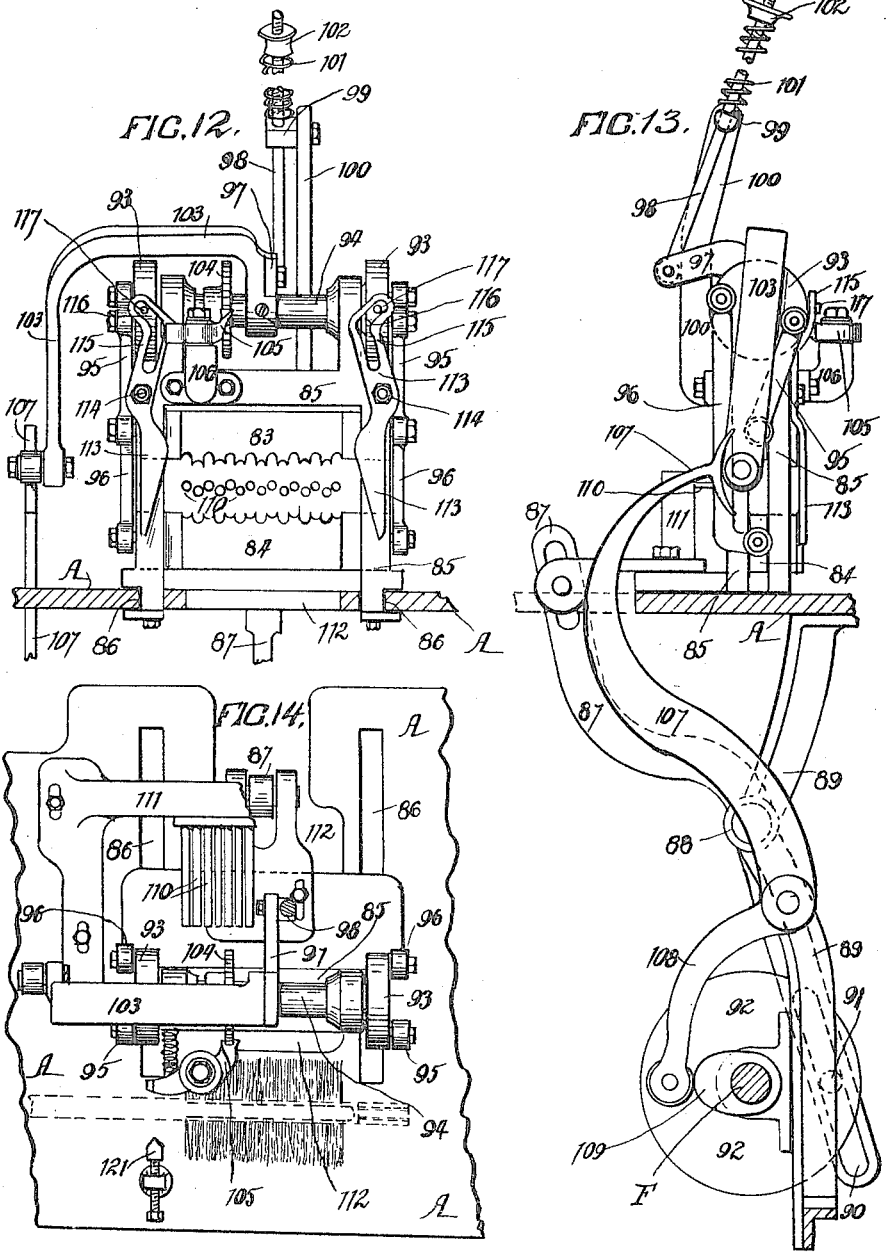

UNITED STATES PATENT OFFICE.

SAMUEL GEORGE ROSEMAN, OF POINT CHEVALIER, NEW ZEALAND.

BRUSH-MAKING MACHINERY.

1,123,596.

Specification of Letters Patent.

Patented Jan. 5, 1915.

Application filed November 4, 1913. Serial No. 799,140.

*To all whom it may concern:*

Be it known that I, SAMUEL GEORGE ROSEMAN, subject of the King of Great Britain, residing at Point Chevalier, Auckland, New Zealand, have invented a new and useful Improvement in Brush-Making Machinery; and I do hereby declare the following to be a full, clear, and exact description of the same.

This invention relates to an improved machine that has been designed for forming the bunches of hair, fiber or other like material used in the construction of brooms and brushes of various kinds and which are inserted in holes in a stock or head or into ferrules or clamps of different kinds to form the broom or brush.

The machine has been designed to carry out a number of functions in sequence and by which a layer of the brush material is first divided off from a quantity thereof arranged within a magazine, one edge of the layer then treated with a cementing composition or pitch and the layer then brought under the action of bunching jaws which engage the cemented edge and divide the layer into separate bunches and compress the material of each bunch together so as to cause the cement to adhere and bind the material in the bunched form, and then for the bunches to be freed from the jaws.

The invention will be described with relation to the accompanying drawings which illustrate a machine that is double acting in that it provides for layers of material being brought alternately from both ends of the machine to centrally situated bunching jaws. It will be readily understood however that the machine may be constructed to withdraw the layers from one end only.

In such drawings:—Figure 1 is a front elevation of the machine, the brush material magazine being removed. Fig. 2 is a side elevation of the magazine. Fig. 3 is a front elevation, and Fig. 4 a plan, thereof on an enlarged scale, the front plate being removed to clearly show the construction. Fig. 5 is an underneath plan of a parting needle. Fig. 6 is a side view of the mechanism employed for treating the layer with the binding cement. Fig. 7 is a plan thereof. Figs. 8 to 11 are detail views illustrating the construction of the means for removing the layers from the magazines. Fig. 12 is a front elevation. Fig. 13 a side elevation, and Fig. 14 a plan of the bunching jaws and their actuating means.

In the description of the machine's construction and working, the term "fiber" will be used as indicating the material for forming the bunches and will be meant to cover all the materials commonly used for such purpose.

The machine comprises a table A which forms a support for a magazine B arranged at each end thereof, bunching jaws C disposed midway between the two magazines and the layer dividing means and clamp D. The table also serves to support the main power shaft E (Fig. 2) for operating the magazines and the layer clamp, and a countershaft F (Fig. 14) for operating the bunching jaws, which countershaft in the double machine shown is geared at a 2 to 1 ratio with the main shaft in order to rotate at double the rate thereof.

The construction of the several parts will be described in individual detail and in their coöperative arrangement in describing the working of the machine.

The magazine B is formed by a back plate 1 (Figs. 3 and 5) and side plates 2 having forwardly extending arms 3 on which a front plate 4 rests. This front plate is made with a spring pressure plate 5 arranged in front of it and which has lugs 6 that engage with teeth 7 in the arms 3. A screw 8 passes in through the center of the pressure plate and engages the front plate 4 so as to adjust its position between the side plates. The fiber is arranged in a mass to extend from back to front of the magazine and the front plate serves to keep it firmly in place. This plate being adjustable in its position permits of the magazine being arranged to receive varying lengths of fiber. The magazine thus formed is bottomless and is mounted to slide up and down in the vertical slide guides 9 fixed to the table A. When the magazine is down, blocks 10 (Figs. 1, 3 and 4) serve as the bottom to the magazine and to support the fiber mass therein. These blocks are arranged longitudinally with the table and a distance apart from each other to permit of the clamp D passing between them.

Fixed to the back of the magazine is a rod 11 that passes vertically down through the table A and is provided at its lower end with an elbow extension 12 having a spring joint connection 13 that serves to keep it normally continuous with the rod. Pivotally supported in the bottom frame of the table is a rocking beam 14 that is rocked on its pivot 15 by means of a crank arm 16 and an eccentric rod 120 coupled to an eccentric strap 17 upon the main shaft E (Figs. 1 and 2). The rotation of the shaft is adapted thus to rock the end of the beam up and down and such end is so disposed as to engage beneath the elbow extension 12 as it moves upward and to thereby raise the rod and the magazine with it, and then to pass from beneath the end of such extension and to permit the magazine to drop again, the spring hinge turning out and allowing the beam on its downward movement to position itself beneath the rod end again. The bottom end of the extension is furnished with an antifriction roller 18 to cause it to slide freely off the end of the beam.

The beam is made double ended, its two ends being adapted to actuate the respective magazines situated at the two ends of the table, so that such magazines are raised and dropped alternately.

A dash pot 19 is arranged on the table to receive and cushion the impact of the falling magazine as it falls when released from the rocking beam. The piston of this dash pot is furnished with a rod 20 extending down through the table and which when depressed engages the inner end of a lever 21 pivoted to the table frame and raises its other end. This other end is arranged to engage the bottom end of a rod 22 passing up through the table and provided at its upper end with a bar 23 having a number of upwardly extending spikes 24 thereon. This bar and the spikes are kept normally drawn down by means of a spring 25 so that they lie beneath the level of the blocks 10 but when raised through the depression of the dash pot rod 20 they project up above such level and extend into the magazine bottom so as to pass between the fiber and hold it from moving away when the parting needle enters the magazine in the manner to be hereinafter explained.

An automatically falling weight 26 (Figs. 4 and 5) is provided to fit into the magazine and to rest on the fiber therein and keep it packed down firmly as the layers are removed from the bottom of the magazine in the operation of the machine. This weight is provided with a spring cushioned foot 27 and is also provided with spring controlled pawls 28 that engage with ratchets 29 formed in channels 30 made in the side plates 2 of the magazine. These pawls and ratchets are so arranged as to allow of the weight slipping down in the magazine but to prevent it rising. The magazine when it drops is subjected to a certain amount of jar which causes the weight to move down and pack the fiber closely on to the blocks 10, the pawls sliding over the ratchets and preventing any upward reaction of the weight. The weight is also furnished with the runner rollers 31 to reduce the friction of its working.

Extending from the inner side plates 2 are the horizontal slide rods 32 which support a slide block 33 adapted to move to and fro on the rods and to which the layer parting needle 34 is fixed. This needle is shown in Figs. 4–6 and is adapted to pass into the side of the magazine at a distance above the blocks 10 equal to the thickness of the fiber layer to be removed from the magazine.

The needle is shaped to allow its passage through the fiber packed on the blocks 10, and to divide therefrom a portion, and when the magazine rises, to travel therewith forming a support for the fiber contained therein. The underside of the needle is formed with the groove 35 (Fig. 6) extending from its outer to near its inner end.

The layer removing clamp D is constructed as shown in the detail drawings Figs. 9–12 and is operated as shown in Figs. 1 and 2. It consists of a slide block 36 mounted to slide longitudinally to and fro along the table A and projecting below such table. A toothed rack 37 is fastened along its bottom edge and a similar rack 38 (Fig. 1) is fixed along the under frame of the table in a parallel position with the rack 37. A pinion 39 is arranged to gear with both racks and is caused to roll along the bottom rack and thereby impart a longitudinal movement to the upper rack 37 and the slide block 36, by means of a crank rod 40 passing through a sleeve 41 pivotally supported on the center of the pinion and receiving motion from the disk wheel 42 (Fig. 2) mounted on the main shaft E. Provision is made for the clamp remaining stationary at each limit of its movement for a short period while the magazine is being lifted and this is effected by arranging tappet nuts 43 on the rod 40 at a distance from each end of the sleeve 41 so that the rod as it reverses its movement in each direction will travel idly through the sleeve for a short while.

Each end of the slide block 36 at its top edge is provided with a longitudinally projecting plate 44 that constitutes the upper member of each clamp. Beneath this plate is arranged the lower member 45 of the clamp which is adapted to move up and down and thus to approach toward and recede from the upper member of the clamp. This member of the clamp is formed hollow inside, as shown in the cross sectional view Fig. 11 and within the hollow slides a long bar 46 which extends also through guides in the slide block and into the lower member of the clamp at the other end of such block. This bar is provided with cross pins 47 which pass out through diagonal slots 48 formed in the sides of the clamp member, those at one end being oppositely inclined to those at the other end. A longitudinal movement to the bar 46 will consequently, by reason of the pins 47 engaging in these diagonal slots, cause the lower clamp member of one clamp to move up while the other moves down and vice versa. The upper clamp member 44 is shaped to fit into the groove 35 of the parting needle 34 as the clamp slide block is moved toward each magazine and then to engage with the end of such groove and carry the parting needle into the magazine in the required manner. Then when the magazine rises, the needle leaves the clamp and is lifted with the magazine. A small depression 49 is formed in the top of the plate 44 and a tooth 49$^A$ is pivoted in the block 33 of the parting needle and is adapted to engage in this depression.

When the magazine is released and drops, this tooth engages in the depression, as the slide block 36 moves out and causes the needle to be carried out with it to permit of the fiber in the magazine settling on to the blocks 10. The release of the magazine is arranged to take place as the clamp leaves the magazine.

The clamps at the opposite ends act reversely to one another, one leaving its magazine while the other is entering and in their operation, the former opening to release the fiber layer held within it, while the other closes to grip the layer that has been divided off from the fiber mass.

Each clamp enters the magazine at its end, the lower member 45 passing in between the blocks 10 so as to be below the fiber while the upper member passes in within the needle 34 so as to extend above a layer of the fiber. Longitudinal movement in the necessary direction is then imparted to the bar 46 to cause the lower member to rise and grip the layer between it and the upper plate 44. At the same time the magazine begins to rise to divide off the main part of the fiber, a finger piece 50 pivoted to the end of the bar 46 and which is arranged to project beyond the clamp end, as the clamp closes is caused to rise by the movement of the bar in its inclined slots and cover the opening between the upper and lower members of the clamp at the end thereof and thereby retain the fiber in the clamp.

The means for conveying this longitudinal movement to the bar 46 at each end of the clamp's travel are shown in Figs. 1 and 2. These consist of an actuating bar 51 mounted in guide blocks 52 fixed to the table and extending parallel with and in front of the clamp slide block 36. A block 53 is attached firmly to the bar 46 and slides over the bar 51. Tappet pieces 54 are arranged on the bar 51 one on each side of this block 53 and are adapted to engage this block. These tappet pieces are so disposed that the clamp in its travel will move between them without engaging, but provision is made for movement in a reverse direction being imparted to the bar 51 at each limit of the clamp's travel, and for this movement to cause the tappet 54 at that end, to engage the block 53 and move the bar 46 a distance necessary to actuate the clamps. These movements of the bar 51 are obtained by means of the arms 55 and 56 (Fig. 2) arranged at the back of the disk wheel 42 and rotating therewith, one arm 55 of which, as the wheel rotates is adapted to engage a stop 57 on the bar 51 and draw the bar over in one direction and then pass beneath it, while the other arm 56 is adapted to engage the tail of a lever 58 that is pivoted to the table frame and the other end of which is articulated to the bar 51, and to push such tail over to draw the bar in the other direction and then pass beneath it. The arm 55 and stop 57 and the arm 56 and lever 58 are arranged in respectively different planes so that in the rotation of the arms, the arm 55 will miss the lever 58 and the arm 56 will miss the stop 57. The arms are arranged at diametrically opposite points and are so disposed with relation to the crank rod 40 that they will actuate the rod 51 in the respective directions at each end of the clamp's travel. Thus each complete rotation of the disk wheel 42 is adapted to cause the clamp at each end to enter its magazine, to close on a layer, and to carry such layer out, and then to open and release the layer, the two clamps acting reversely in the manner already described.

While the layer held in the clamp remains in position beneath the magazine and before it is moved outward, its inner edge is treated with a cement composition so as to adapt the fiber ends to be bound together when divided off into bunches and subjected to pressure. The means for effecting this operation are shown in enlarged detail in Figs. 7 and 8, Fig. 7 being an inside elevation and Fig. 8 a plan.

A bracket 59 is fixed to extend rearwardly from the inner slide guide 9 and this bracket carries a lever 60 pivoted thereto and extending inward toward the back of the magazine. A spring 61 is connected to the lever and to an overhanging arm 62 fixed to the guide 9 and is arranged to normally draw the lever upward. To the free end of the lever is pivoted a vertically disposed arm 63 that at its lower end carries a brush 64 which when the lever is depressed is immersed in a tank 65 adapted to hold the binding cement. This brush is preferably made with metal spikes and it is arranged with its spikes facing forward as shown in Fig. 7. The brush when in the raised position is situated on a level with the fiber layer in the magazine which is indicated by the dotted lines in Fig. 7.

A second bracket 66 attached to the guide 9 carries bearings for a transverse spindle 67 and upon this spindle is fixed a cam wheel 68 having one or more cams 69 thereon. A pinion 70 (Fig. 8) is also fixed on the spindle and a rack 71 is attached to the magazine back 1 and gears with this pinion so as to rotate it and the spindle when the magazine is raised. The lever 60, when in the raised position, positions the upper end of the brush arm 63 in the line of rotation of the cams 69 on the wheel 68 so that the cams engaging therewith will rock the arm on its pivot and cause the brush end to be moved inward and to engage with the fiber ends and subject them to the cement that has been raised on the brush from the cement tank. The top end of this arm is formed as a spring pawl 72 so that on the downward travel of the magazine and the consequent reverse movement of the spindle, the cams will pass idly over the arm.

The brush lever 60 is adapted to be depressed when the magazine is down and to be freed as it rises and for this purpose, a bracket 73 is fixed to extend rearwardly from the magazine lifting rod 11 so as to rise and fall with it. From the end of this bracket depends a swinging arm 74 having a notch 75 on its bottom end. A short pin 76 extends from the side of the lever 60 and a spring 77 serves to keep the arm 74 against the side of this pin when the magazine is down, and then as the magazine rises, moves it outward so that the notch overlies the pin, as shown by the dotted lines in Fig. 7. Then on the downward movement of the magazine and bracket 73, the arm 74 bearing on the pin forces the lever 60 down to its lowered position again. A deflector plate 78 is fixed to the bracket 59 alongside the swinging arm 74 and a pin 79 on this arm is adapted to engage with an inclined top of this plate and by its engagement, as the magazine falls, to swing the arm in and release the lever 60 from the notch. The lever is then prevented from rising by the engagement of a pin 80 on its side with the tooth of a spring pawl 81 pivoted on the bracket 59 beneath which it passes as the lever is depressed, being in turn released from this pawl by means of a stop 82 on the bracket 73 engaging the top end of the pawl and tipping it back from the pin 80 as the magazine reaches the lowest limit of its movement. The lever is then freed so that on the next upward movement of the magazine it may rise under the influence of its spring. The movements of the various parts of this apparatus are clearly shown by the dotted lines in Fig. 7. The layer which has thus been divided off and treated with the cementing composition is then removed by the outward travel of the clamp, the magazine being timed to fall as the layer moves from beneath it, and the parting needle 34 being removed and positioned ready to be again carried in to the magazine to divide off another layer. The clamp is moved along by its operating mechanism until it positions its layer in front of the bunching jaws, the construction and operation of which are clearly shown in Figs. 13-15. These jaws are adapted in their operation to move forward as each layer clamp positions itself in front of them and then to close together on to the cement treated edge of the layer held in the clamp, the clamp opening to release the layer simultaneously with the closing of the buncher jaws. The jaws then move backward carrying the layer with them and open so as to release the bunches which have then been formed.

The jaws 83 and 84 are formed of blocks of metal made with semi-circular depressions extending across their adjacent faces, adapted to dovetail into one another when the jaws are brought together and thereby form full circular holes with dividing teeth between them. These jaws are mounted to slide up and down in the vertically arranged guide frame 85 that is mounted in slides 86 formed transversely across the table A so that the frame may move to and fro across such table. These movement are imparted to the frame by means of the lever 87 (Fig. 14) that is pivoted at 88 to a bracket 89 on the underframe of the table and the upper end of which is articulated to the back end of the frame while its lower end is formed with a groove 90 in which works a crank pin 91 fixed on the disk 92 firmly mounted on the countershaft F. Each rotation of this countershaft therefore moves the frame 85 in and out over the table.

The jaws 83 and 84 are repectively connected at both ends to disk wheels 93 fixed upon the ends of a spindle 94 journaled along the top of the frame 85, by means of links 95 and 96 which are pivoted to the ends of the jaws and to the disk faces at diametrically opposite points. The partial rotation of the disks in opposite directions will therefore draw the jaws together and apart. The jaws are adapted to be normally closed by means of a lever 97 extending radially from the spindle 94 and to the outer end of which is articulated a rod 98 that extends upward and slides through a block 99 pivoted on a bracket 100 fixed to the frame 85, and the upper end of which rod is encircled by a spring 101 that is compressed between the block 99 and an adjustable nut 102 upon the top end of the rod. The tension of this spring therefore drives the outer end of the lever 97 upward thereby turning the spindle 94 in a direction such as to close the jaws.

Extending from the spindle is an arm 103 that extends across to one side of the frame and depends down alongside it in the manner shown in Fig. 13. This arm when moved forward at its bottom end is adapted to rotate the spindle against the action of the spring 101 and to thus open the jaws, compressing the spring to a greater extent so that when the arm 103 is released, the jaws will be closed hard upon each other. To retain the jaws in the open position, a ratchet wheel 104 is mounted on the spindle and a pawl 105 is mounted on a small support 106 fixed to the front of the frame and engages the teeth of this ratchet in such a manner as to permit of the spindle turning in a direction to open the jaws, but to prevent any reverse movement. A stop 121 is fixed on the front of the table A in such a position that as the frame moves forward and reaches its forward limit, a tail of the pawl 105 will be engaged and the pawl turned out of contact with the ratchet, thereby permitting the jaws to close on to the fiber layer that has been positioned in front of them by the movement of the clamp. As the frame moves rearward again, a lever arm 107 engages the end of the arm 103 and causes such arm to turn and open the jaws. This lever arm 107 has a forward movement imparted to it to push the arm end 103 forward. It is arranged to extend below the table and is pivoted to the bracket 89 and formed with a downward extension 108 with which a cam 109 secured on the countershaft F engages and the throw of which is timed to take place as the frame 85 reaches the back limit of its movement. In this manner the jaws are caused to close on to the layer when the frame moves forward and to open when it moves back in order to form the bunches between them and to draw them from the clamp and release them.

As the jaws move backward the openings between them pass over a number of ejector pins 110 extending forwardly from a bracket 111 fixed on the table. These pins engage the cemented ends of the bunches and as the jaws open, eject the bunches from between them so that they will fall through an opening 112 (Fig. 15) formed in the table and into a receptacle placed conveniently beneath it. In order to prevent any liability of the fiber layer spreading outward as the jaws close upon it, the two sides of the frame 85 are provided with the lever fingers 113 pivoted at 114 thereto and each adapted to turn in sidewise and engage the corresponding end of the fiber layer as the jaws close. The upper ends 115 of these levers are formed with slots 116 therein in which pins 117 on the disks 93 pass. These slots are so shaped that as the disks turn with the closing of the jaws, the fingers 113 will be turned in and as the jaws open will be moved out again.

In the operation therefore layers of fiber are conveyed from each end of the machine alternately and brought under the action of the bunching jaws to be divided into bunches and compressed into such form by the adhesion of the cement treated ends of such fiber. Should the cement be of such a nature as to require heat to liquefy it the cement tank may be heated by any approved means and the cement laid on the fiber then cooled by its subjection to air blasts as it moves along to the bunching jaws in order to insure its proper adhesion when subjected to the pressure of the jaws.

What I do claim as my invention and desire to secure by Letters Patent is:—

1. A machine for the purpose described comprising a magazine adapted to contain the fiber and provided with means whereby it may be raised and lowered, a parting needle mounted on one side of the magazine and adapted to pass in through it at a distance above its bottom and to divide off a layer of the fiber, a sliding clamp consisting of upper and lower horizontal members adapted to move into the magazine so that its upper member lies above the fiber layer while its lower member extends beneath such layer and provided with means for closing the two members together upon the layer, means for treating the edge of the layer with a binding cement while the magazine rises, means for removing the clamp, and bunching jaws constructed to close upon the cement treated edge of the layer and to divide it into separate bunches, substantially as specified.

2. In a machine for forming fiber bunches, a magazine to hold the fiber consisting of a vertical back and side plates and an adjustable spring cushioned front plate, a machine table having vertically extending slide guides within which the magazine is fitted, a rod extending down through the table attached at its upper end to the magazine, a rocking beam pivoted underneath the table and adapted in its upward movement to engage the lower end of the rod and carry it up and then to pass from beneath it, and means whereby up and down movement may be imparted to the rocking beam, substantially as specified.

3. In a machine for forming fiber bunches, the combination with a magazine adapted to hold the fiber and to move up and down, of slide rods extending from one side of the magazine, and a parting needle mounted on such rods and adapted to be moved in to extend across the magazine at a distance from the bottom thereof, substantially as specified.

4. In a machine for forming fiber bunches, a magazine adapted to hold the fiber and to be moved up and down, a parting needle mounted on one side of the magazine and capable of sliding in and out of the magazine at a level a distance from the bottom thereof, a sliding clamp consisting of an upper member adapted to engage the parting needle and a lower member disposed to pass in beneath the bottom of the magazine when the clamp is moved inward, and means for the engagement of the clamp by the parting needle as the clamp is moved outward, substantially as specified.

5. In a machine for forming fiber bunches, the combination with a magazine adapted to contain the fiber and to be raised and lowered, and with means for dividing off and holding a layer of fiber from the bottom of that in the magazine, of a brush lever pivoted to a fixture at the back of the magazine, a vertical rocking arm at the inner end of such lever, a brush upon the bottom of the rocking arm, means for depressing the brush lever and brush when the magazine is down and for raising them when the magazine rises until the brush is level with the fiber layer removed from the magazine, a spindle mounted in bearings upon fixtures at the back of the magazine, a disk having cam projections on its periphery adapted when rotated to engage the top end of the brush carrying rocking arm, means for rotating the spindle by the upward movement of the magazine and a cement containing tank into which the brush is plunged when in the depressed position substantially as and for the purposes specified.

6. In a machine for forming fiber bunches, a magazine adapted to contain the fiber, a parting needle mounted to slide into and out of the side of the magazine and to divide off a layer from the bottom of the fiber, a clamp adapted to slide into and out of the magazine and composed of an upper member adapted to pass in beneath the parting needle and a lower member adapted to pass beneath the bottom of the magazine and formed with diagonal slots therein, a bar extending longitudinally through the lower member and capable of sliding movement therein, pins extending laterally from the bar and fitting into the diagonal slots, and means whereby sliding movements may be imparted to such bar at each limit of the clamp's movement in reverse directions, substantially as and for the purposes specified.

7. In a machine for forming fiber bunches, a table, a magazine arranged to move up and down above such table, a sliding clamp mounted on the table and adapted to grip and remove a layer of fiber from the bottom of the magazine, a frame mounted on the table and adapted to move to and fro transversely across the table, a pair of bunching jaws arranged in such frame and adapted to move together and apart therein, and means for normally closing the jaws and for forcing them apart when the frame is moved backward and for freeing them so that they may close when the frame moves forward, substantially as and for the purposes specified.

8. In a machine for forming fiber bunches the combination with means for holding a layer of fiber, of means for dividing the layer into bunches consisting of a pair of jaws adapted to close on to opposite sides of the layer and each one of which is formed with depressions adapted to meet with those in the other, a frame in which such jaws are mounted and adapted to be moved up to and away from the layer, a spindle mounted across the top of such frame, disk wheels secured upon the ends of the spindle, links connecting the respective jaws at each end with the corresponding disk wheel at points diametrically opposite, a lever arm on the spindle and a spring drawing such arm upward to turn the spindle to close the jaws, and means whereby the spindle may be turned in an opposite direction and retained from movement when the frame is moved back and whereby the spindle may be released when the frame is moved up to the layer, substantially as specified.

9. In a machine for forming fiber bunches, the combination with bunching jaws adapted to divide a layer of fiber into bunches, and mounted in a frame to which forward and backward movement is imparted, of fixed ejector pins adapted to pass between the bunching jaws as the frame is moved backward, substantially as and for the purpose specified.

In testimony whereof, I have signed this specification in the presence of two subscribing witnesses.

SAMUEL GEORGE ROSEMAN.

Witnesses:
C. BURHAN SMITH,
E. F. COURTNEY.

Copies of this patent may be obtained for five cents each, by addressing the "Commissioner of Patents, Washington, D. C."